Patented June 6, 1950

2,510,696

UNITED STATES PATENT OFFICE 2,510,696

FUNGICIDAL COMPOSITION COMPRISING A 4,5-PYRAZOLEDIONE-4-OXIME

Byron A. Hunter and Norman K. Sundholm, Naugatuck, Conn., assignors to United States Rubber Company, New York, N. Y., a corporation of New Jersey No Drawing. Application February 12, 1947, Serial No. 728,194

10 Claims. (Cl. 167—33)

This invention relates to new and useful improvements in fungicides. The invention further relates to methods of treating plants, and to methods of protecting organic material subject to attack by microorganisms, as the immunizing of seed, and the mildewproofing of fabrics and other material.

We have found that 4,5-pyrazoledione-4-oximes are effective fungicides. The structure of these compounds may be represented by the formula:

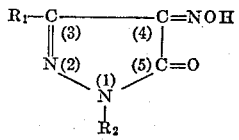

wherein $R_1$ and $R_2$ may be hydrogen, or an aliphatic radical, or an aromatic radical. Examples of 4,5-pyrazoledione-4-oximes are:

4,5-pyrazoledione-4-oxime
1-methyl-4,5-pyrazoledione-4-oxime
3-methyl-4,5-pyrazoledione-4-oxime
3-ethyl-4,5-pyrazoledione-4-oxime
3-propyl-4,5-pyrazoledione-4-oxime
1,3-dimethyl-4,5-pyrazoledione-4-oxime
3-ethyl-1-methyl-4,5-pyrazoledione-4-oxime
1-phenyl-3-butyl-4,5-pyrazoledione-4-oxime
1,3-diphenyl-4,5-pyrazoledione-4-oxime
1-(4-chlorophenyl)-3-methyl-4,5-pyrazoledione-4-oxime
1-(4-methoxyphenyl)-4,5-pyrazoledione-4-oxime The preparation of the 4,5-pyrazoledione-4-oximes is well known. In general, they are formed by the reaction of nitrous acid on the corresponding 5-pyrazolone, which is prepared by reacting hydrazine or a monosubstituted hydrazine with a β-keto ester. They can also be prepared by reacting the isonitroso-β-keto ester with hydrazine or a substituted hydrazine.

The 4,5-pyrazoledione-4-oximes may be used as seed protectants and disinfectants, and to protect plants, which term includes plant parts, or soil from microorganisms harmful to seeds and plants. They may also be applied to prevent or retard fungus growth and the formation of mildew on organic material, such as wood, fur, rope, hair, feathers, cotton, wool, synthetic organic fibers, and the like. They may be applied as a dust, as in admixture with a powdered solid carrier, such as clay or talc, or they may be applied as a liquid or spray in a liquid carrier, as in solution in a suitable solvent, or suspended in a suitable non-solvent, for example, water. Preferably when applied in aqueous suspension, the composition contains a dispersing agent for the chemical. In seed treatment, the 4,5-pyrazoledione-4-oximes are preferably applied to the seed, as by tumbling with the chemical admixed with a powdered solid carrier. In foliage treatment, the 4,5-pyrazoledione-4-oximes are preferably applied to the plant parts by spraying with an aqueous suspension of the chemical containing a dispersing agent. The chemicals may be applied to foliage by the aerosol method. Solutions for the aerosol treatment may be prepared by dissolving the chemical directly in the highly volatile liquid carrier or first dissolving the chemical in a less volatile solvent and then admixing such solution with the highly volatile liquid aerosol carrier. The 4,5-pyrazoledione-4-oximes may be used admixed with carriers that are active of themselves, for example, other fungicides, or bactericides, insecticides, insectifuges, fertilizers, hormones.

The examples below showing the effectiveness of various 4,5-pyrazoledione-4-oximes as fungicides are given to illustrate the invention.

The 1-phenyl-3-methyl-4,5-pyrazoledione-4-oxime tested in the examples below was prepared as follows: A solution of 17.5 g. (.1 mol) of 1-phenyl-3-methyl-5-pyrazolone in a mixture of 9 cc. of concentrated hydrochloric acid and 40 cc. of water was cooled and stirred in a mixture of ice and water. A cool solution of 7 g. of sodium nitrite in 15 cc. of water was added slowly. An orange solid separated. The mixture was stirred for one-half hour. The solid product was removed by filtration, washed with water, and recrystallized from alcohol. The product had an orange color and melted at 158° C. Knorr (Berichte 17, 2042) gave a melting point of 157° C. The 1-(4-chlorophenyl)-3-methyl-4,5-pyrazoledione-4-oxime, m. p. 182–183° C., was prepared similarly. Chattaway and Strouts (Journal Chemical Society (London) 125, 2426) gave a melting point of 180° C. The 1,3-diphenyl-4,5-pyrazoledione-4-oxime, m. p. 203° C., was prepared similarly. Sachs and Becherescu (Berichte 36, 1135) gave a melting point of 200° C. The 3-methyl-4,5-pyrazoledione-4-oxime, m. p. 237° C., was prepared similarly. Wolff (Berichte 37, 2832) gave a melting point of 232° C.

Example I

The various 4,5-pyrazoledione-4-oximes were sprayed on tomato plants in the form of aqueous suspensions of the chemicals at a dosage of 2000 parts per million (p. p. m.). The aqueous suspensions of the chemicals contained a small amount of the commercial surface-active dispersing agent Emulphor EL, which is a condensation product of castor oil and ethylene oxide. When the sprayed plants were sufficiently dried, the thus treated plants, together with untreated (check) plants, were uniformly inoculated by spraying onto the foliage an aqueous suspension of spores of *Alternaria solani*, the fungus responsible for a serious blight disease of this crop. The plants were placed in an inoculation chamber at 75° F. and 99% humidity for 20 hours, after which they were removed to normal greenhouse conditions. After 48 hours in the greenhouse, the effectiveness of the various 4,5-pyrazoledione-4-oximes was determined by counting the blight lesions on the tomato plants treated with the various 4,5-pyrazoledione-4-oximes, and comparing with the number of blight lesions on the check plants which were not treated with the chemicals. The percent control by the various 4,5-pyrazoledione-4-oximes is shown in the following table:

| Treatment Chemical | Control |
|---|---|
| | *Per cent* |
| 1-Phenyl-3-methyl-4,5-pyrazoledione-4-oxime | 97 |
| 1-(p-Chlorophenyl)-3-methyl-4,5-pyrazoledione-4-oxime | 99 |
| 1,3-Diphenyl-4,5-pyrazoledione-4-oxime | 83 |
| 3-Methyl-4,5-pyrazoledione-4-oxime | 93 |

*Example II*

The following table lists the dosage in parts per million (p. p. m.) at which the 4,5-pyrazoledione-4-oximes tested inhibit completely the germination of *Alternaria solani* and *Sclerotinia americana* fungi spores on glass slides. The procedure used is that outlined in Phytopathology 33, 627 (1943).

| Chemical | *Alternaria solani* | *Sclerotinia americana* |
|---|---|---|
| | *P. P. M.* | *P. P. M.* |
| 1-Phenyl-3-methyl-4, 5-pyrazoledione-4-oxime | 100 | 100 |
| 1-(p-Chlorophenyl)-3-methyl-4, 5-pyrazoledione-4-oxime | 100 | 100 |
| 1, 3-Diphenyl-4, 5-pyrazoledione-4-oxime | 1,000 | 1,000 |

Having thus described our invention, what we claim and desire to protect by Letters Patent is:

1. A fungicidal composition comprising an aqueous suspension of a 4,5-pyrazoledione-4-oxime, in which the nitrogen in the 1-position is attached to a member of the group consisting of hydrogen and aryl radicals and the carbon in the 3-position is attached to a member of the group consisting of alkyl and aryl radicals, said aqueous suspension containing a dispersing agent.

2. A fungicidal composition comprising an aqueous suspension of a 1-aryl-4,5-pyrazoledione-4-oxime, said aqueous suspension containing a dispersing agent.

3. A fungicidal composition comprising an aqueous suspension of 1-phenyl-3-methyl-4,5-pyrazoledione-4-oxime, said aqueous suspension containing a dispersing agent.

4. A fungicidal composition comprising an aqueous suspension of 1-(p-chlorophenyl)-3-methyl-4,5-pyrazoledione-4-oxime, said aqueous suspension containing a dispersing agent.

5. A fungicidal composition comprising an aqueous suspension of 1,3-diphenyl-4,5-pyrazoledione-4-oxime, said aqueous suspension containing a dispersing agent.

6. A fungicidal composition comprising a 4,5-pyrazoledione-4-oxime in which the nitrogen in the 1-position is attached to a member of the group consisting of hydrogen and aryl radicals and the carbon in the 3-position is attached to a member of the group consisting of alkyl and aryl radicals, said composition containing a surface-active dispersing agent.

7. A fungicidal composition comprising a 1-aryl-4,5-pyrazoledione-4-oxime and a surface-active dispersing agent.

8. A fungicidal composition comprising a 1-phenyl-3-methyl-4,5-pyrazoledione-4-oxime and a surface-active dispersing agent.

9. A fungicidal composition comprising 1-(p-chlorophenyl) - 3 - methyl - 4,5 - pyrazoledione-4-oxime and a surface-active dispersing agent.

10. A fungicidal composition comprising 1,3-diphenyl-4,5-pyrazoledione-4-oxime and a surface-active dispersing agent.

BYRON A. HUNTER.
NORMAN K. SUNDHOLM.

REFERENCES CITED

The following references are of record in the file of this patent:

Knorr: Berichte, vol. 17, page 2042.
Chattaway and Strouts: Journal Chem. Soc. (London), vol. 125, page 2426.
Sachs and Becherescu: Berichte, vol. 36, page 1135.
Wolff: Berichte, vol. 37, page 2832.